UNITED STATES PATENT OFFICE.

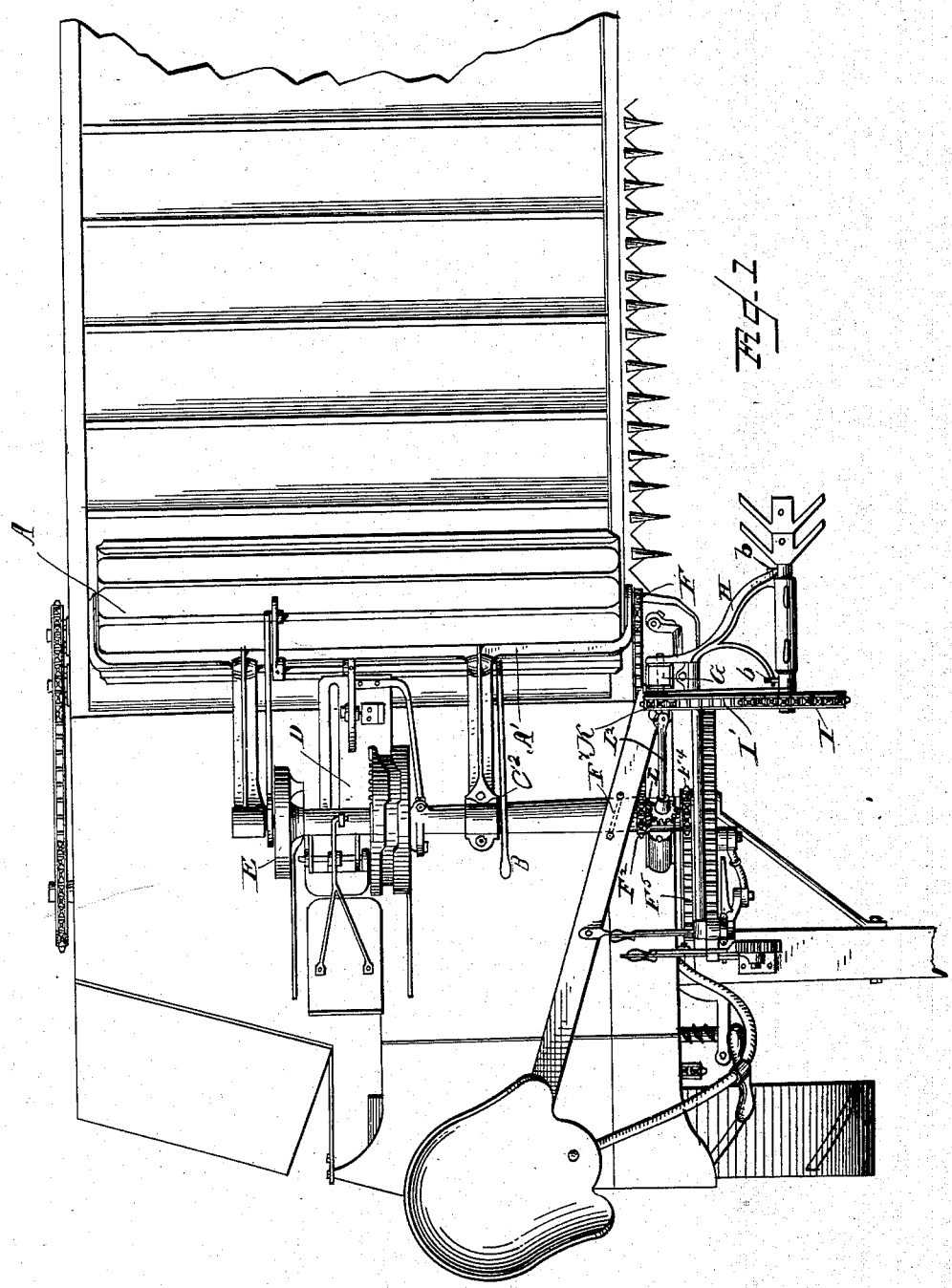

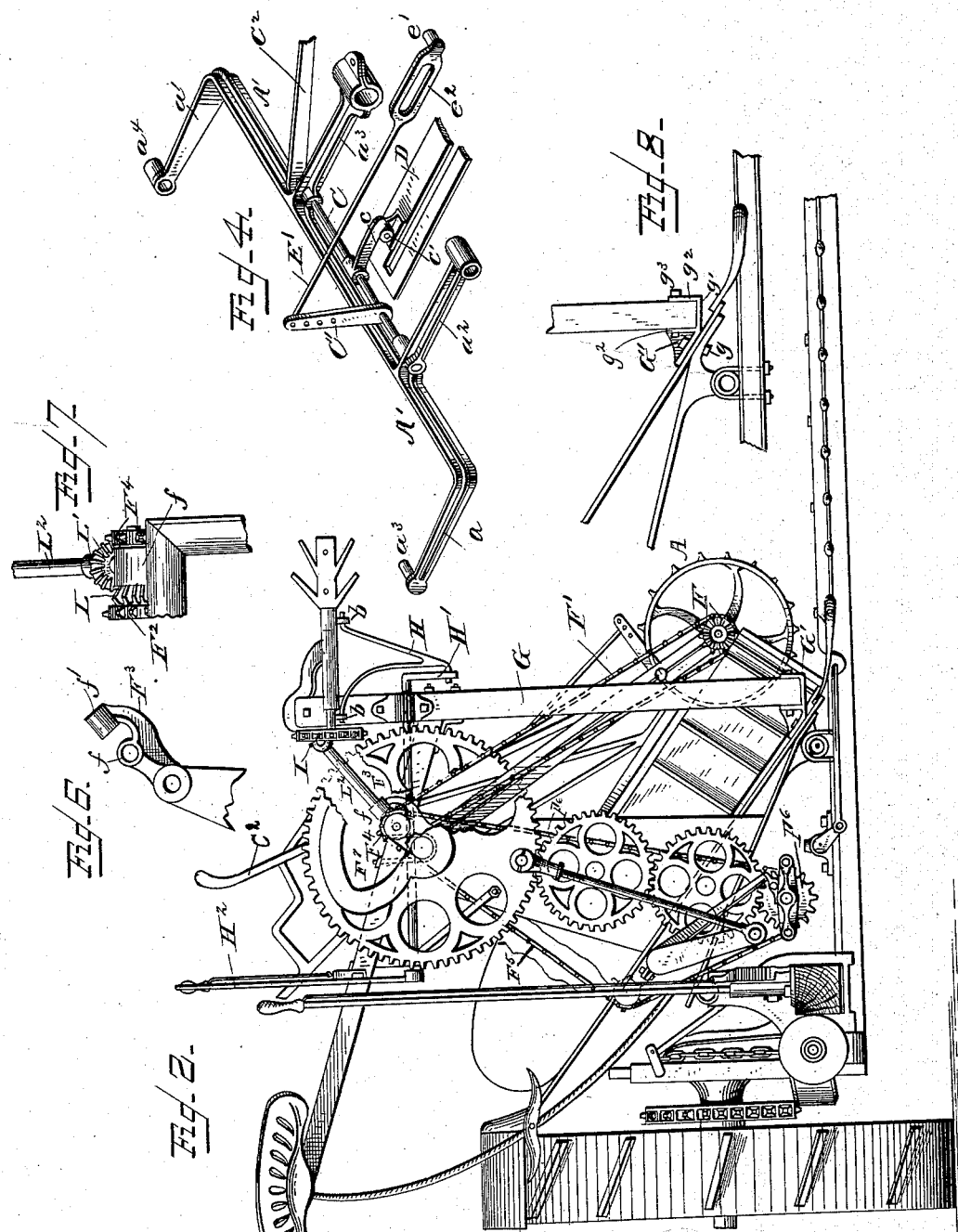

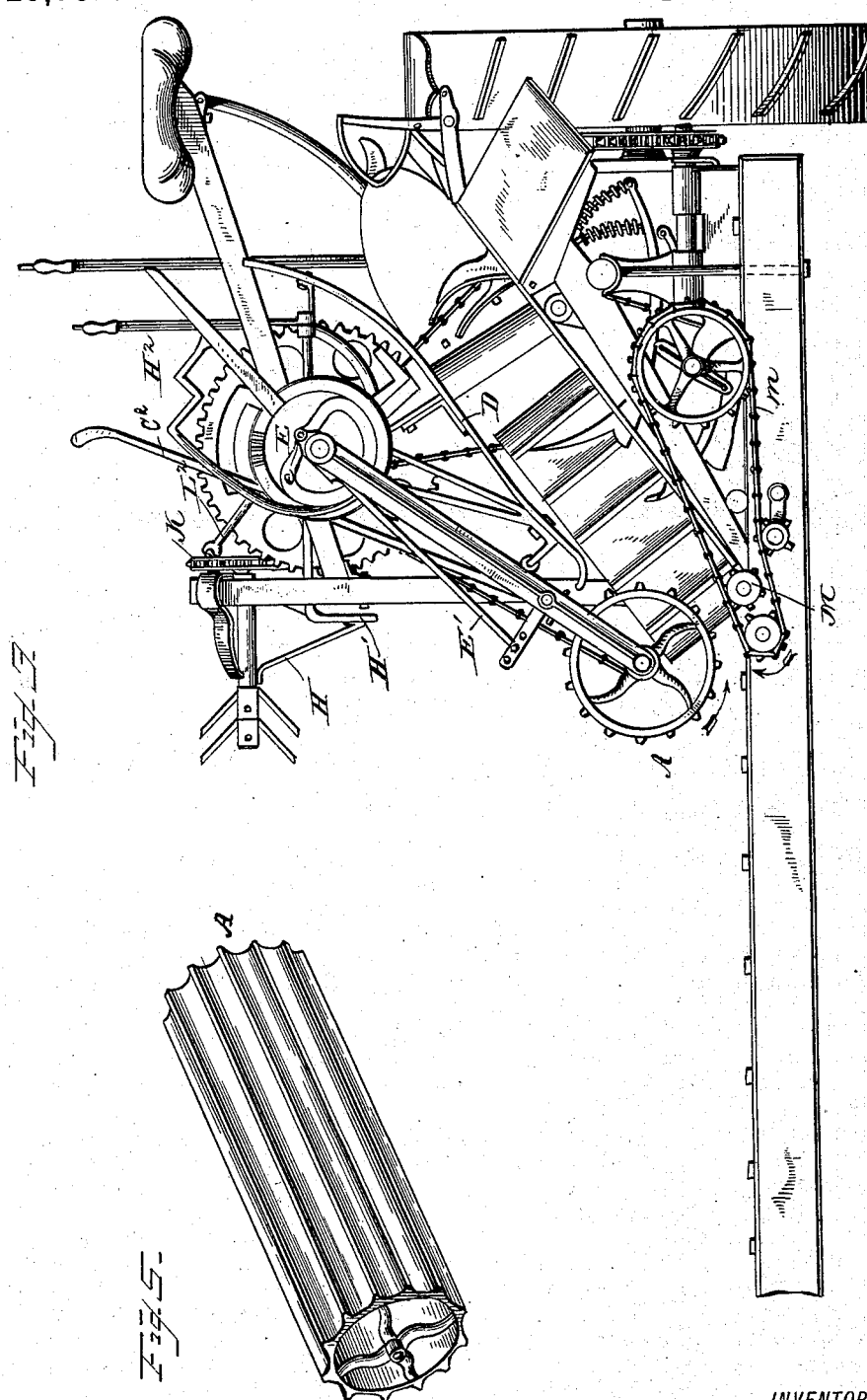

THOMAS C. MARSHALL, OF AKRON, OHIO, ASSIGNOR TO LEWIS MILLER, OF SAME PLACE.

GRAIN-BINDING HARVESTER.

SPECIFICATION forming part of Letters Patent No. 325,752, dated September 8, 1885.

Application filed December 8, 1883. (No model.)

*To all whom it may concern:*

Be it known that I, THOMAS C. MARSHALL, of Akron, county of Summit, and State of Ohio, have invented a new and useful Improvement in Grain-Binding Harvesters, of which the following is a full, clear, and exact description, reference being had to the accompanying drawings, making part of this specification.

My invention relates to that class of grain-binding harvesters in which the grain is bound upon an inclined elevating binder-table interposed between the platform-carrier and the drive-wheel; and it consists in the employment of a roller interposed between the platform-carrier and the inclined binder-table, said roller being supported in a pivoted frame or arms extending from the binder-standard, whereby it is adapted to be vibrated up and down for regulating its pressure upon the grain; also, in the combination, with said roller-frame, of a cam-wheel secured upon and rotating with the knotter-actuating shaft, and means connecting the roller-frame with said cam-wheel, whereby the roller-frame is rocked upon its pivotal connection with the binder-standard and the roller is automatically raised and lowered; and in the combination, with such roller, of the adjustable butter for regulating the passage of the grain to the binder mechanism.

My invention further consists in the manner of supporting the reel-post, at its lower end, upon the binder-frame in advance of the roller and butter above referred to, and at or near its upper end from the binder-gear standard; in the manner of driving the roller referred to from the main driving-shaft; and, also, in the manner of driving the reel from said shaft, and in certain details of construction and arrangement hereinafter explained.

In the accompanying drawings, Figure 1 represents a plan view of so much of a grain-binding harvester as is necessary to show my improvements. Fig. 2 is a front elevation of the same, showing the manner of supporting the reel-post and the arrangement of mechanism for driving the reel and feed-roller. Fig. 3 is a rear elevation of the same, showing the means for vibrating the feed-roller. Fig. 4 is an enlarged perspective view, showing the construction and arrangement of the feed-roller frame and the levers and other mechanism for rocking the same. Fig. 5 is a perspective view of the feed-roller detached. Fig. 6 is a side elevation of a portion of the main binder-gear standard and bearing-bracket attached thereto for the reception of suitable gear-wheels and shafts, forming part of the reel-driving mechanism. Fig. 7 is a transverse view of the same, and Fig. 8 is an enlarged view of a portion of the reel-post and its supporting-bracket.

The machine in its general construction and arrangement of parts is similar to others now in common use, and need not, therefore, be described in detail herein further than is requisite to a complete understanding of my present improvement.

A represents a feed-roller, by preference of the fluted form shown in detail in Fig. 5, suspended over the junction of the platform-carrier and the inclined binder-table, and adapted to be rotated by suitable and novel mechanism, to be hereinafter described, for the purpose of assisting in the movement of the grain toward the binding mechanism after it leaves the platform-carrier and before it is engaged by the packers. This feed-roller A is mounted in bearings in an adjustable frame, A', shown most clearly in Fig. 4, and is substantially in the form of a yoke having two arms, $a$ $a'$, extending upon each end of the feed-roller, one, $a$, provided with a stud-axle, $a^3$, which enters a tubular hub formed upon one end of the said feed-roller, and the other arm, $a'$, provided with a short sleeve, $a^4$, adapted to receive and form a bearing for a stud-axle formed upon the other end of the feed-roller. The frame A' is also provided with other arms, $a^2$ $a^3$, as shown, rigidly attached thereto and extending backward away from the roller to the knotter-actuating shaft-sleeve B. Said arms are provided each with a sleeve upon its end, one, by preference, made of such size as will adapt it to fit upon the knotter-actuating shaft, and the other made larger to adapt it to fit around the tubular sleeve inclosing said shaft. It will thus be seen that the frame A' is adapted to be vibrated upon the knotter-actuating shaft and its sleeve as a pivot. For the purpose of rocking said frame A', carrying roller A, upon its pivot, the following parts are employed: A rock-shaft, C, is provided, mounted in bearings near the inner ends of the arms $a^2$ $a^3$, before described, and it has a small lever, $c$, bearing and working upon a roller, $c'$, or equivalent on the upper face of the knotter-shield or breast-plate D, as shown in Figs. 3 and 4. Another lever, C', is rigidly secured to the rock-shaft C at substantially a right angle to the small lever $c$, hereinabove referred to, whereby, when the lever C' is vibrated inward toward the knotter-shaft, the small lever $c$ will act and bear upon the roller $c'$ on the breast-plate, and the outer end of the frame carrying the feed roller will be swung upward, relieving the grain of the pressure and influence of the roller during the process of binding the grain, as hereinafter explained.

Mounted upon the knotter-actuating shaft and rotating therewith is an eccentric, or, by preference, a wheel, E, having an eccentrically-formed groove, $e$, in its side. This wheel being mounted upon and rotating with the knotter-shaft, it receives an intermittent motion, and is actuated only when the knotter-shaft is actuated; and it will be observed that as the knotter-shaft revolves only when the binding mechanism is in operation the eccentrically-grooved wheel, being dependent upon the said shaft for its motion, is revolved during the process of binding only. The lever C', above described, is connected with said eccentrically-grooved wheel E by means of a suitable rod or link, E', made in the form substantially as shown, secured at one end to the lever C', and at its other end provided with a spur, $e'$, which enters the eccentrically-grooved wheel E, by which means the link E' is actuated for rocking the lever C' and vibrating the feed-roller frame. The link E' is also provided with an enlarged slotted portion, $e^2$, for the purpose of allowing said link to straddle the knotter-actuating shaft. Thus it will be seen that when the binding mechanism is thrown into action, and the knotter-actuating shaft, carrying the eccentrically-grooved wheel, is revolved, the lever C' of the feed-roller frame A' will be vibrated through the medium of the connecting-link E', and the feed-roller A will be raised above the moving grain during the process of binding a bundle. The rock-shaft C is further provided with a hand-lever, $C^2$, for enabling the driver at any time to elevate the feed-roller and suspend its action upon the grain when it is desired to allow the grain to accumulate upon the binder-table.

For the purpose of driving or rotating the feed-roller A, it is provided upon one end, by preference the forward end, with a sprocket-wheel, F, securely attached thereto, and engaged by an endless drive-chain, F', passing around it and also around a similar sprocket-wheel, $F^2$, mounted upon a shaft journaled in bearings in a bracket, $F^3$, attached to the upper end of the main binder-gear standard. Upon this same shaft which carries the sprocket-wheel $F^2$ is mounted a similar wheel, $F^4$, which is engaged and rotated by an endless chain, $F^5$, passing around it and actuated by means of a sprocket-wheel, $F^6$, fast upon and rotating with the binder-gear shaft, this arrangement allowing the roller A to be vibrated without interfering with the mechanism for driving the same.

G represents the reel-standard, which is secured at its upper end through the seat-standard to the sleeve of the binder-gear standard or the sleeve in which the knotter-actuating shaft is mounted by a stirrup, $F^7$, or any other suitable means, and supported at its lower end in an angular bracket, G', secured to the lower extremity of the inclined binder-table where the latter is attached to the one of the inclined transverse bars of the frame, the same bolt, $g$, serving to secure both the binder-table and the reel-standard bracket to the said inclined transverse bar of the frame. The bracket G' has an angular base, $g'$, and vertical walls $g^2$, adapted to receive between them the lower end of the reel-post, allowing, however, sufficient play of the reel-post to adapt it to be rocked on its pivot $g^3$. (Shown in detail in Fig. 8.) The reel-post, at its upper end, is provided, as shown, with a pivoted yoke, which contains a sleeve or collar, forming a journal for the reception of the reel-shaft. These parts and the arrangement thereof not being claimed, and being similar to others now in use, need not be described in detail. The sleeve or journal in which the reel-shaft is mounted is provided with pendent ears or lugs $b$ $b$, perforated to receive the ends of a Y-shaped link, H, which at its lower extremity is connected with and actuated by a crank-shaft, H', mounted in bearings in brackets on the reel-post and gear-standard, as shown, and provided with a hand-lever, $H^2$, for rocking it in its bearings. By vibrating said lever the link H is forced upward and serves to elevate the reel and adjust it to any desired height. Upon the inner end of the reel-shaft is secured a sprocket-wheel, I, adapted to receive and be actuated by an endless drive-chain, I', which also passes around a similar wheel, K, mounted upon a short shaft secured in the reel-post G, said shaft by preference serving as a pivot for the yoke which upholds the reel and its shaft, this arrangement permitting the reel to be vibrated or adjusted without interfering with the operation of the chain I', which always remains taut and in working relation to the sprocket-wheels I and K. The upper end of the main binder-gear standard is provided with a bearing-bracket, $F^3$, which has been partially described hereinabove. This bracket is perforated or provided with a bearing at $f$ to receive a short shaft provided with sprocket-wheels $F^2$ and $F^4$, one upon each end, which have also been described as part of the mechanism for driving the feed-roller. One of these wheels—for instance F⁴—is provided upon its inner face with a bevel-gear formation, L; or, if preferred, a separate bevel gear-wheel, fast upon the same shaft with wheel F⁴ and rotating therewith, may be employed. The bevel-wheel L, when in operation, engages a bevel-wheel, L', on the end of a shaft, L², which has its bearings in a sleeve, f', formed upon the bracket F³ for that purpose, the opposite end of shaft L² being connected with the sprocket-wheel K by a universal joint, as shown.

As before mentioned, the bevel wheel L is keyed or otherwise secured upon the same shaft as the sprocket-wheels F² and F⁴, the former, F², being connected with and driven by an endless drive-chain passing around and actuated by a sprocket-wheel on the main binder-gear shaft. Thus it will be seen that the feed-roller and the reel are both driven from the binder-gear shaft.

Located beneath the feed-roller A, and having its upper surface projected slightly above the face of the inclined binder-table, is a supplemental feed roller, M, also actuated from the binder-shaft by means of the chain m, which actuates the inner roller of the platform-carrier, said chain passing over a sprocket-wheel fast upon the rear end of the supplemental feed-roller located between the sprocket-wheels upon the binder-shaft and inner roller of the platform-carrier. The two feed-rollers A and M both revolve inward on their adjacent faces, as indicated by the arrow in Fig. 3, their office being to act upon the moving grain and assist in its progress toward the binding mechanism.

The butter, which is of the usual endless-apron type, is by preference pivoted at its outer or lower end upon the inclined binder-table in advance of the feed-roller, whereby it is adapted to be swung backward or forward at its upper or inner end, for the purpose of guiding, and, in connection with the feed-roller, of conveying the grain to the binding mechanism.

Other parts not particularly described herein may be constructed in any usual or preferred manner.

Having now described my invention, I claim as new—

1. In a grain-binding harvester, a feeding-roller located over the moving grain at the inner end of the horizontal platform-carrier and at the foot of the inclined binder-table, in combination with and supported by a pivoted frame hinged to the binder-gear standard, and means for vibrating said frame and roller, substantially as described.

2. In a grain-binding harvester, a feeding-roller located between the horizontal platform-carrier and the inclined binder-table and binding mechanism, carried by and in combination with a pivoted frame hinged at its inner end to the sleeve supporting the knotter-actuating shaft, and means for vibrating said frame and roller, for the purpose and substantially as specified.

3. In a grain-binding harvester, a roller located between the platform-carrier and the binding mechanism, and having its bearings in a frame hinged to the sleeve supporting the knotter-actuating shaft, in combination with means connecting said frame with the knotter-actuating shaft, whereby during the operation of binding the grain the frame and its roller will be lifted away from the moving grain, substantially as described.

4. In a grain-binding harvester, a roller located between the platform-carrier and the binding mechanism, said roller being mounted in a hinged or pivoted frame, in combination with a rock-shaft mounted in bearings in or upon said frame, a lever for rocking said rock-shaft, and a second lever or arm secured to said rock-shaft and bearing upon a projection of the breast-plate, whereby the hinged frame supporting the roller may be raised for relieving the moving grain of its pressure, substantially as and for the purpose described.

5. In a grain-binding harvester, the combination, with the inclined elevating binder-table, of a feed-roller located above the moving grain and adapted to rise and fall in the manner substantially as set forth, and a second feed-roller located beneath the moving grain, for the purpose and substantially as described.

6. The roller-supporting frame hinged to the sleeve supporting the knotter-actuating shaft and provided with a rock-shaft journaled in said frame, said rock-shaft being provided with an arm or lever bearing upon the knotter-shield or breast-plate, and a lever for actuating said rock-shaft, in combination with a cam-wheel and connecting-rod for vibrating said lever, for the purpose and substantially as described.

7. The roller-supporting frame hinged to the sleeve supporting the knotter-actuating shaft and provided with a rock-shaft journaled in said frame, said rock-shaft having an arm or lever bearing upon the knotter-shield or breast-plate, and a lever for actuating said rock-shaft, in combination with a cam-wheel and connecting-rod for vibrating said lever, said cam-wheel being secured upon and rotating with the knotter-actuating shaft, adapting the cam-wheel to rotate only when the binding mechanism is in operation, whereby the roller-supporting frame is vibrated during the operation of binding a bundle, substantially as described.

8. In a grain-binding harvester, the reel post or standard supported at its lower end upon the binder-frame in advance of the finger-bar and butt-board, in combination with the seat-standard connecting said post at or near its upper end with the sleeve of the binder-gear standard, substantially as described.

9. The reel post or standard supported at its lower end in advance of the finger-bar and feed-roller upon an angular bracket secured to the binder-frame, and connected at its upper end through the seat-standard with the binder-gear standard, in combination with a reel mounted in a yoke pivoted to said reel-standard, a link pivoted to said yoke, and a crank-shaft mounted in bearings attached to the binder-gear standard and reel-post for actuating said link and adjusting the reel, substantially as described.

In testimony whereof I have hereunto set my hand this 8th day of November, A. D. 1883.

THOMAS C. MARSHALL.

Witnesses:
O. L. SADLER,
LEWIS MILLER.